US011607908B2

(12) United States Patent
Spahr et al.

(10) Patent No.: US 11,607,908 B2
(45) Date of Patent: Mar. 21, 2023

(54) HUB, IN PARTICULAR FOR BICYCLES

(71) Applicant: DT SWISS INC., Grand Junction, CO (US)

(72) Inventors: Stefan Spahr, Lengnau (CH); Simon Haas, Feldbrunnen (CH); Martin Walthert, Aarberg (CH)

(73) Assignee: DT SWISS INC., Grand Junction, CO (US)

( * ) Notice: Subject to any disclaimer, the term of this patent is extended or adjusted under 35 U.S.C. 154(b) by 0 days.

(21) Appl. No.: 17/815,488

(22) Filed: Jul. 27, 2022

(65) Prior Publication Data
US 2022/0355617 A1    Nov. 10, 2022

Related U.S. Application Data (63) Continuation of application No. 16/862,816, filed on Apr. 30, 2020, now Pat. No. 11,400,754, which is a
(Continued)

(30) Foreign Application Priority Data

Jul. 26, 2016  (DE) .......................... 102016113731.6
Jul. 26, 2016  (DE) .......................... 102016113733.2
(Continued)

(51) Int. Cl.
*B60B 27/02* (2006.01)
*B60B 27/04* (2006.01)
(Continued)

(52) U.S. Cl.
CPC .......... *B60B 27/023* (2013.01); *B60B 27/001* (2013.01); *B60B 27/047* (2013.01); *F16C 33/585* (2013.01); *F16D 41/24* (2013.01)

(58) Field of Classification Search
CPC ... B60B 27/047; B60B 27/001; B60B 27/023; B60B 27/0073; B60B 27/0031;
(Continued)

(56) References Cited

U.S. PATENT DOCUMENTS 5,676,227 A   10/1997 Hügi
6,588,564 B1  7/2003 Jaeger
(Continued)

FOREIGN PATENT DOCUMENTS

DE   102004004961 A1   8/2005
DE   202011108852 U1   1/2012
(Continued)

OTHER PUBLICATIONS

German Search Report Received in German Application No. 10 2020 103 129.7 dated Aug. 10, 2020.
(Continued)

*Primary Examiner* — Tinh Dang
(74) *Attorney, Agent, or Firm* — Greer, Burns & Crain, Ltd (57) ABSTRACT

A hub for partially muscle-powered vehicles, including a hollow hub axle with a cylindrical inner through hole for the passage of a clamping axle, a hub shell rotatably supported relative to the hub axle by two hub bearings, a rotor rotatably supported relative to the hub axle, and a freewheel device with a hub-side freewheel component and a rotor-side freewheel component, each having axial engagement components for engagement with one another. The hub shell is rotatably supported relative to the hub axle in a rotor-side end region by a rotor-side hub bearing, and in an opposite end region of the hub shell by another hub bearing. The hub-side freewheel component is non-rotatably connected with the hub shell. The rotor-side freewheel component is non-rotatably connected with the rotor and is movable in the
(Continued)

axial direction relative to the rotor and the hub shell between a freewheel position and an engagement position.

19 Claims, 4 Drawing Sheets

Related U.S. Application Data continuation-in-part of application No. 16/503,110, filed on Jul. 3, 2019, now Pat. No. 11,220,133, and a continuation-in-part of application No. 16/255,231, filed on Jan. 23, 2019, now Pat. No. 10,933,691, and a continuation-in-part of application No. 16/039,831, filed on Jul. 19, 2018, now Pat. No. 10,995,806, which is a continuation-in-part of application No. 15/882,423, filed on Jan. 29, 2018, now Pat. No. 10,625,540, said application No. 16/255,231 is a continuation-in-part of application No. 15/882,423, filed on Jan. 29, 2018, which is a continuation-in-part of application No. 15/659,830, filed on Jul. 26, 2017, now Pat. No. 10,442,245, and a continuation-in-part of application No. 15/659,850, filed on Jul. 26, 2017, now Pat. No. 10,549,578.

(30) Foreign Application Priority Data

| Jul. 26, 2017 | (DE) | 102017116954.7 |
|---|---|---|
| Jul. 26, 2017 | (DE) | 102017116960.1 |
| Jan. 25, 2018 | (DE) | 102018101720.0 |
| Jul. 6, 2018 | (DE) | 102018116465.3 |

(51) Int. Cl.
*F16D 41/24* (2006.01)
*B60B 27/00* (2006.01)
*F16C 33/58* (2006.01)

(58) Field of Classification Search
CPC ............ B60B 27/0078; B60B 27/0047; B60B 2380/14; B60B 2900/111; B60B 2900/311; B60B 27/0015; B60B 2320/10; B60B 2360/102; B60B 2360/36; B60B 2900/113; B60B 2900/321; B60B 2900/531; B60B 2900/541; F16D 41/24; F16D 41/36; F16D 41/30; F16D 2121/14; F16D 2200/0021; F16D 2200/006; F16D 2250/0084; F16D 2300/12; B62M 6/40; F16C 35/077; F16C 16/06
See application file for complete search history.

(56) References Cited

U.S. PATENT DOCUMENTS

| 7,562,755 | B2 | 7/2009 | Spahr |
| 9,010,875 | B2 | 4/2015 | Spahr et al. |
| 9,212,708 | B2 | 12/2015 | Spahr et al. |
| 10,421,316 | B2 | 9/2019 | Braedt et al. |
| 2008/0006500 | A1 | 1/2008 | Spahr |
| 2009/0277741 | A1 | 11/2009 | Chen |
| 2013/0088075 | A1 | 4/2013 | Spahr et al. |
| 2014/0062164 | A1 | 3/2014 | Spahr et al. |

FOREIGN PATENT DOCUMENTS

| DE | 102010033268 A1 | 2/2012 |
| DE | 102010033454 A1 | 2/2012 |
| DE | 202018001877 U1 | 1/2017 |

OTHER PUBLICATIONS

European Search Report received in Application No. 21154792.2, dated May 18, 2021.

HUB, IN PARTICULAR FOR BICYCLES

RELATED APPLICATIONS

The present application is a Continuation of U.S. patent application Ser. No. 16/862,816 filed Apr. 30, 2020, which is a Continuation-in-Part of and claims 35 USC 120 priority from U.S. patent application Ser. No. 16/503,110 filed Jul. 3, 2019; is also a Continuation-in-Part of and claims 35 USC 120 priority from U.S. patent application Ser. No. 16/255,231 filed Jan. 23, 2019, which is a Continuation-in Part of U.S. patent application Ser. No. 15/882,423 filed Jan. 29, 2018, now U.S. Pat. No. 10,625,540, which is also a Continuation-in-Part of both U.S. application Ser. No. 15/659,830 now U.S. Pat. No. 10,442,245 and U.S. application Ser. No. 15/659,850, now U.S. Pat. No. 10,549,578 both filed Jul. 26, 2017; and is also a Continuation-in-Part of and claims 35 USC 120 priority from U.S. patent application Ser. No. 16/039,831 filed Jul. 19, 2018, which is a Continuation-in Part of U.S. patent application Ser. No. 15/882,423 filed Jan. 29, 2018, which is also a Continuation-in-Part of both U.S. application Ser. No. 15/659,830 now U.S. Pat. No. 10,442,245 and U.S. application Ser. No. 15/659,850 now U.S. Pat. No. 10,549,578, both filed Jul. 26, 2017 all of which are incorporated by reference herein.

BACKGROUND

The present invention relates to a hub for vehicles and in particular bicycles, which in normal and regular proper use are at least partially muscle-powered, the hub comprising a hub shell which is in particular rotatably supported relative to a hub axle by way of two roller bearings disposed on opposite end regions of the hub shell. The hub comprises a rotor for non-rotatable arrangement of at least one sprocket, the rotor being in particular rotatably supported relative to the hub axle by means of at least two rotor bearings. A freewheel device is provided between the rotor and the hub shell.

Other than in bicycles, the hub may be used in other partially muscle-powered vehicles and two-wheeled vehicles which are for example provided with an electric auxiliary drive. The hub is in particular used in sports bicycles. In all the configurations the hub according to the invention is employed in vehicles and in particular bicycles which in normal and regular proper use are at least partially muscle-powered.

The prior art has disclosed various hubs comprising a freewheel so that the pedal crank will not keep rotating along for example during a downhill ride. This freewheel also allows contra-rotating of the hub shell versus the rotor in backpedaling.

The prior art has disclosed hubs with ratchet freewheels where the pawls can radially pivot between a freewheel position and an engagement position. These hubs are provided with different numbers of ratchet pawls and tend to show four ratchet pawls symmetrically distributed over the circumference. As force is transmitted, the ratchet pawls engage a toothing in the rotor. The relatively low number of ratchet pawls results in a relatively large angle of rotation before rotational force is transmitted when pedaling is resumed.

DE 94 19 357 U1 has disclosed a hub with a toothed disk freewheel which reliably and very quickly transmits the driving force from the rotor to the hub shell while otherwise, friction losses are relatively low while the user is not actuating the pedals. A toothed disk freewheel has many advantages and allows a particularly fast response of the freewheel. In this freewheel a pair of toothed disks transmits forward rotational force of the rotor while in backpedaling, the teeth disengage axially. The known hub per se functions satisfactorily and is used in the area of sports and also in professional riding. However, there is the disadvantage that in the case of overloads and in the very high loads acting on the hub for example in uphill rides, the bending moments generated in the hub may be such that they cause the toothed disk to slightly tilt which results in higher wear on the teeth, which are subjected to higher forces so that durability is limited and the toothed disks require early replacement to avoid malfunction.

DE 10 2010 033 268 A1 discloses a hub in which two end-toothed components form an axial freewheel. Pairs of adjacent hub bearings at the hub shell ends serve as supports relative to the hub axle. The drawback is the high space requirement for the adjacent hub bearings. Moreover, the hub axle is not provided with any radial shoulders so that it cannot serve to axially support the hub components. Therefore, to axially support the hub the axial force is transmitted from a roller bearing by means of its rolling member into the hub shell on one side and on the other side it is dissipated through the rolling members of a roller bearing via sleeve elements disposed on the hub axle. In another embodiment shown in a simplistic illustration, one or two hub bearings are accommodated on the inside of the end-toothed component, and in yet another embodiment shown in a simplistic illustration, an end toothing of the axial freewheel is integrally formed at the outer bearing race of the hub bearing so as to enable saving axial mounting space if only one hub bearing is used. The drawback is, however, that the axial forces must again be transmitted radially through the rolling members of the bearing into the hub shell. A freewheel must be configured for rotational forces of up to 400 Nm and higher. This means that in the course of operation the end-toothed component screwed into the hub shell keeps being urged ever further into the hub shell to result in a locally high compression of the hub shell. The high loads may result in local hub shell deformation. Deformation also involves deformation of the bearing seat or the bearing shell, which may result in considerable drawbacks as regards the durability of the hub and also in disadvantageous riding properties.

Also, hubs with toothed disk freewheels have been disclosed which are provided with a freewheel having an axial toothing, wherein an axial toothing is fixedly integrated in the rotor and a toothed disk is non-rotatably and axially displaceably accommodated in the hub shell by means of one or more springs and is axially biased in the direction toward the toothing in the rotor. Reversely, a hub has also been disclosed which includes a toothed disk freewheel and has a toothed disk fixedly integrated in the hub shell and where the other of the toothed disks is biased by means of a spring in the direction of the hub shell. Then again, both these hub types providing for axial movability of only one of the toothed disks show the disadvantage due to the high loads in sports or professional cycling that some of the teeth are subjected to higher loads and faster wear so that early replacement on a regular basis is advisable of the toothed disks, the rotor or even the hub shell to avoid malfunction.

A feasible alternative would be a stiffer configuration overall of a hub with a toothed disk freewheel by employing stiffer and thus heavier materials or by employing greater wall thicknesses which would increase the weight though.

However, since in sports and professional cycling each and every gram of weight counts, this does not provide the desired solution.

Thus, DE 10 2004 004 961 B4 has disclosed a bicycle hub with a hub shell surrounding the hub axle, and two hub bearings disposed between the hub axle and the hub shell, a freewheeling body, two freewheel bearings disposed between the hub axle and the freewheeling body, and a toothed disk freewheel between the hub shell and the freewheeling body. For reinforcing the hub, the hub axle is thickened or bulged inwardly in the region of the freewheel-side hub bearing, and on the outside surface, a reinforcing sleeve is pushed onto the hub axle between the hub bearings to reduce the risk of elastic deflection. The known hub is functional per se, offering high stability. Its drawback is that the bulge reduces the inner clear diameter so that no longer any desired through axle can be used. Moreover, the weight increases considerably. The additional weight from the bulge is per se minor, but the larger dimensions caused thereby make the system considerably heavier overall.

EP 1 121 255 B1 has disclosed a lightweight hub having a toothed disk freewheel and showing reliable function wherein the teeth of the toothed disks are stressed more evenly. This hub uses a pair of toothed disks, both of which are axially movable and are axially urged toward one another from the outside by means of a spring. The two toothed disks are thus floatingly supported and e.g. in case of hub deflection or given other types of stresses they may show better positioning to one another so as to provide more even wear on the toothed disks and a particularly reliable operation. However, an even stiffer hub is desirable.

DE 10 2016 113 731 to the applicant discloses a lightweight hub with a toothed disk freewheel and reliable function. In this hub, the toothed disk freewheel comprises a rotor-side freewheel component and a hub-side freewheel component. The hub-side freewheel component is screwed into the hub shell, forming a bearing seat for a roller bearing accommodated therein for supporting the hub shell. This allows an increase in the lateral distance of the two roller bearings for supporting the hub shell, thus increasing the rigidity of the hub. Some applications, however, call for a still more increased rigidity of the hub without increase in weight.

Against the background of the prior art, it is therefore the object of the present invention to provide a lightweight hub which provides for structurally reduced deformation in operation.

SUMMARY

A hub according to the invention is provided for at least partially muscle-powered vehicles and in particular two-wheeled vehicles and preferably bicycles, and comprises a hollow hub axle with a substantially cylindrical inner through hole for the passage of a clamping axle such as a quick release axle and/or a through axle, a hub shell supported by at least two hub bearings for rotation relative to the hub axle, which is rotatably supported relative to a hub axle. The hub comprises a rotor supported rotatably relative to the hub axle for non-rotatable disposal of at least one sprocket. A freewheel device having two interacting freewheel components is comprised namely, a hub-side freewheel component and a rotor-side freewheel component. The two freewheel components each comprise axial engagement components for intermeshing with one another and they are movable relative to one another in the axial direction at least between a freewheel position and an intermeshing engagement position. The hub-side freewheel component (and the axial engagement components configured thereat) is non-rotatably connected with the hub shell. The rotor-side freewheel component (and the axial engagement components formed thereat) is non-rotatably connected with the rotor and is movable in the axial direction relative to the rotor and the hub shell at least between a freewheel position and an engagement position. The hub shell is supported in a rotor-side end region with a rotor-side hub bearing and in an opposite end region of the hub shell with at least one further hub bearing, for rotation relative to the hub axle. The rotor-side hub bearing is radially accommodated in a bearing seat between the hollow hub axle and the rotor-side freewheel component in an axially longitudinal section of the hub axle showing a diameter that is enlarged compared to a central region of the hub axle.

Preferably, the hub shell is rotatably supported relative to and in particular on the hub axle by means of two roller bearings disposed on opposite end regions of the hub shell.

The rotor is rotatably supported on the hub axle in particular by at least two rotor bearings relative to the hub axle and in particular by means of the rotor bearing. The rotor is particularly preferably fixedly, respectively axially immovably, disposed in the axial direction in operation.

A particularly preferred specific embodiment of the hub according to the invention is provided, in normal and regular proper use, for at least partially muscle-powered vehicles and in particular two-wheeled vehicles and preferably bicycles, and comprises a hollow hub axle with a substantially cylindrical inner through hole for the passage and accommodation of a clamping axle, a hub shell which is rotatably supported by at least two hub bearings relative to the hub axle, and rotatably supported relative to a hub axle by means of two roller bearings disposed in opposite end regions of the hub shell. The hub comprises a rotor rotatably supported on the hub axle by means of at least two rotor bearings to non-rotatably dispose at least one sprocket. The rotor is fixedly, respectively axially immovably, disposed in the axial direction in operation. A freewheel device having two interacting freewheel components is comprised namely, a hub-side freewheel component and a rotor-side freewheel component. The two freewheel components each comprise axial engagement components for intermeshing with one another and they are movable relative to one another in the axial direction at least between a freewheel position and an intermeshing engagement position. The hub-side freewheel component, and thus the axial engagement components formed thereat, are non-rotatably and axially fixedly connected with the hub shell. The rotor-side freewheel component, and thus also the axial engagement components configured thereat, are non-rotatably connected with the rotor. The rotor-side freewheel component is movable in the axial direction relative to the rotor and the hub shell at least between a freewheel position and an engagement position. The hub shell is supported in a rotor-side end region by a rotor-side hub bearing and in an end region of the hub shell opposite to the rotor-side end region, by at least one further hub bearing, for rotation relative to the hub axle. The rotor-side hub bearing is radially accommodated in a bearing seat between the hollow hub axle and the rotor-side freewheel component in an axially longitudinal section of the hub axle showing a diameter that is enlarged compared to a central region of the hub axle.

A clamping axle is in particular configured as a quick release axle and/or as a through axle.

The hub according to the invention has many advantages. The hub according to the invention allows a very rigid while lightweight structure and versatile applications. An axially longitudinal section showing an enlarged diameter on which the bearing seat for the rotor-side hub bearing is configured, achieves a clearly increased rigidity. Peak loads can be greatly reduced (by a factor of 1.5 or 2 or 3 and more) and the durability, increased. This noticeably increases stability under load combined with a very low total weight.

Another considerable advantage is that even in the case of considerable overloads, as they only occur in exceptional situations in normal bicycle operation, safe operation is ensured. Specifically, with electrically assisted bicycles and also with professionally used bicycles, these overloads in a standard configuration hub tend to arise frequently. This is why a hub according to the invention is advantageous because (due to the optimized weight) it withstands increased loads.

Slight deformation or axle deflection due to high loads and in particular overloads is essential for the reliability of the freewheeling function and also for precision of the shifting operation. The outer diameter of a sprocket attached to the rotor will run non-round at if the axle deflects. Larger sprockets and higher forces acting on the chain lead to critical situations. This is a significant advantage in safeguarding for overloads. Specifically—but not limited to—electro-assisted bicycles.

A significant advantage is that an internal cylindrical through hole is provided which can be adapted respectively matched to the outer diameter of a clamping axle. The hub axle preferably shows a substantially or (nearly) entirely cylindrical inner surface. For example, the clear inner diameter may be 12 mm. Basically, larger inner diameters of 13 mm, 14 mm or even 15 mm or 16 mm or 18 mm or 20 mm or more are possible. The inner diameter may be considerably larger.

In present times, the maximum diameter tends to be limited by the design of the rotor body respectively the freewheeling body standard and by the size of the smallest sprocket. If the hub is driven, instead of by a rotor and sprockets respectively sprocket cluster mounted thereon, e.g. by a toothed belt, other diameters are feasible.

Particularly preferably, the clear inner diameter of the hub axle varies over the length of the hub axle by less than 20% and in particular less than 15% and preferably less than 10%. The length of the hub axle includes the region of the hub shell as well as the region of the rotor and thus in particular the entire longitudinal extension of the hub axle. Preferably, the clear inner diameter of the hub axle varies over the entire length of the hub axle by less than 2.5 mm or 2.0 mm, and in particular less than 1.5 mm or 1 mm.

Particularly preferably, the hub axle is largely cylindrical in configuration. The largely cylindrical internal shape of the hub axle enables to accommodate (in a close fit) e.g. a through axle having a standardized diameter. A difference in diameters between the clamping axle and the clear diameter of the through hole may be 0.2 mm or 0.1 mm or 0.05 mm or less. Then, the clamping axle and the hub axle support one another in operation, already in the case of tiny or minor deflections, virtually over the entire length of the hub axle. At any rate, supporting one another is preferably present if deflection actually occurs, or would occur, in the case of high loads. Now the construction results in a particularly rigid configuration already in minor and medium, and also in very high or abrupt loads. Even in the case of high and highest loads, only very minor deformations show.

A considerable advantage of the hub is achieved by the fact that only the region of the rotor-side hub bearing shows an axially longitudinal section with an enlarged outer diameter where the bearing seat is configured for the inner bearing ring of the rotor-side hub bearing which is configured as a roller bearing. The bearing seat for the outer bearing ring of the rotor-side hub bearing is preferably configured directly in the hub-side freewheel component. The additional weight owing to the enlarged outer diameter in the axially longitudinal section is very low. And in fact, the total weight of the hub can even be reduced, given the same or overall increased stability, since the wall thicknesses of the hub axle e.g. in the central region and in the outermost end regions can be reduced. On the whole the load acting on the hub is distributed more evenly.

Preferably, the inner through hole of the hub axle comprises an (at least substantially) cylindrical inner surface.

In a preferred specific embodiment, the axially longitudinal section is configured shorter than 30 mm and in particular shorter than 25 mm. The axial length in a particularly preferred configuration is approximately 20 mm.

Preferably two, and in particular exactly two radial bulges are configured on the hub axle. The two radial bulges are preferably configured in the region of the roller bearings to support the hub shell. Preferably, the radial bulges show on the axially inwardly face a (continuous or gradual or stepless or stepped) increase of the wall thickness and a shoulder each is configured on the axially outwardly side. These shoulders may serve as stoppers for the inner bearing ring of the roller bearings to support the hub shell. Optionally a spacer such as a disk or a sleeve may be inserted between the stopper and the roller bearing. In all of these configurations, forces may be transmitted through the hub axle and the spacers such as disks, sleeve bodies and inner bearing shells of the roller bearings.

The axially longitudinal section preferably comprises the radial bulge on the rotor side of the hub shell. The axial length of the axially longitudinal section without the region of the radial bulge is preferably less than 20 mm and in particular less than 15 mm.

The axial length of the bearing seat for the inner bearing ring on the axially longitudinal section is preferably less than 15 mm and in a concrete configuration it may be approximately 10 mm.

Particularly preferably, the hub axle is configured cylindrical and, other than the bearing seat in the axially longitudinal section and the radial bulges against which the roller bearings rest to support the hub shell, it shows a substantially constant diameter and a substantially constant wall thickness wherein the diameter and the wall thickness vary by less than 25% and preferably less than 15%. The interior of the hub axle is particularly preferably exactly cylindrical in configuration.

Preferably, the roller bearings disposed on the opposite end regions of the hub shell rest axially inwardly with their respective inner rings against the radial bulges of the hub axle. The hub axle is thus employed for form-fit force transmission.

In the axially longitudinal section, the wall thickness near the bearing seat is preferably between 2 mm and 5 mm or 4 mm. In a preferred configuration, the wall thickness near the bearing seat in the axially longitudinal section is between 2 mm and 3 mm and in a concrete configuration, 2.5 mm (+/−10%).

In advantageous configurations, the central region shows a wall thickness of the hub axle of less than 2.5 mm and in particular less than or equal to 2.0 mm. Preferably, the wall thickness in the central region is greater than 0.75 mm and in particular greater than 1.0 mm. In a concrete configuration the wall thickness in the central region is 1.5 mm (+/−20%).

Particularly preferably, the hub axle shows a (nearly) constant wall thickness outside of the radial bulges and the axially longitudinal section. In the region of the radial bulges the wall thickness is preferably less than 5 mm (+/−10%) and may be e.g. approximately 4 mm.

The outer diameter of the hub axle, in particular in the axially longitudinal section, is between 15 mm and 20 mm, preferably approximately 17 mm. In the central region of the hub axle, the outer diameter of the hub axle is in particular between 10 mm and 15 mm, preferably approximately 12 mm, particularly preferably minimally larger than 12 mm.

Preferably, the rotor-side hub bearing shows an outer diameter between 25 mm and 32 mm and in particular between 26 mm and 30 mm, and a width between 5 mm and 8 mm or 10 mm. In a concrete configuration, the outer diameter is approximately 28 mm and the width, approximately 7 mm.

In preferred configurations, the clamping axle is comprised and/or the hub is configured and provided for the use of defined clamping axles (and clamping axle systems).

Particularly preferably, the clamping axle shows, at least in the region of the hub shell and the rotor, a substantially cylindrical outer surface. This means in particular, that in the interior of the hub the clamping axle shows a substantially cylindrical, and preferably nearly completely cylindrical, or alternately completely cylindrical outer surface.

In advantageous configurations, the outer surface of the clamping axle radially deviates from a cylindrical shape, in the region of the hub shell and the rotor (thus in particular in the interior of the hub) by less than 0.2 mm and in particular less than 0.1 mm. It is also possible to achieve a radial deviation of less than 0.05 or 0.02 mm or 0.01 mm.

The inner diameter of the hub axle and the outer diameter of the clamping axle are in particular coordinated with one another and preferably matched to one another.

Preferably, the maximum radial distance between the clamping axle and the hub axle is less than 0.4 mm. In particular, the maximum radial distance between the clamping axle and the hub axle is less than 0.2 mm and particularly preferably less than 0.1 mm or less than 0.05 or even 0.02 mm or 0.01 mm. These dimensions apply over the length of the clamping axle and the hub axle, apart from the end regions and any circumferential grooves in the hub axle or circumferential grooves if any in the clamping axle, or at least of a threaded portion if any of the clamping axle.

In other preferred configurations, the clamping axle shows a substantially cylindrical outer surface, not over the entire length but (only) at least in one longitudinal region or in two or more longitudinal regions, at least in the region of the hub shell and/or the rotor. This means in particular, that in the interior of the hub the clamping axle shows, over the longitudinal region, a substantially cylindrical, and preferably nearly completely cylindrical, or alternately completely cylindrical outer surface.

In advantageous configurations, the outer surface of the clamping axle radially deviates from a cylindrical shape, in the longitudinal region (in particular in the interior of the hub) by less than 0.2 mm and in particular less than 0.1 mm. It is also possible to achieve a radial deviation of less than 0.05 or 0.02 mm or 0.01 mm.

Preferably, the maximum radial distance between the clamping axle and the hub axle in the longitudinal region is less than 0.4 mm. In particular, the maximum radial distance between the clamping axle and the hub axle in the longitudinal region is less than 0.2 mm and particularly preferably less than 0.1 mm or less than 0.05 or even 0.02 mm or 0.01 mm. These dimensions only apply in the longitudinal region(s).

Preferably, however, the hub-side freewheel component is fixedly but detachably connected with the hub shell. The hub-side freewheel component is in particular screwed into the hub shell. Particularly preferably the screwed connection between the hub shell and the hub-side freewheel component shows at least two thread grooves. Then the hub shell and the hub-side freewheel component are screwed to one another wherein the hub shell thread and/or the hub-side freewheel component thread are preferably each provided with at least two separate, axially spaced apart thread grooves. This construction enables an increased thread groove gradient. The gradient angle is larger and thus the axial force effective in the screwed state is lower. Thus, the pressure acting on the hub shell is lower.

It is possible to provide the hub-side freewheel component and the hub shell with different numbers of thread grooves as long as the shape and configuration of the thread grooves match. For example, the hub-side freewheel component may show a multiple external thread having two thread grooves and e.g. one circumferential rectangular groove so as to provide three circumferential structures. This structure screws into an internal thread having three thread grooves even though only two of the thread grooves engage, providing stability.

It is particularly preferred for the rotor-side freewheel component to be disposed axially farther outwardly than the hub-side freewheel component. In particular, the hub-side freewheel component and the rotor-side freewheel component are axially adjacent to one another in the engaged state. Particularly preferably, the freewheel components engage one another axially but not radially. Preferably, the two freewheel components do not surround each other in the engaging portion.

In all the configurations, it is preferred for at least one thread groove to show a gradient of at least 1.8 mm or 2.0 mm or at least 2.5 mm and in particular at least 3 mm and preferably at least 3.5 mm or 4 mm or 5 mm or 6 mm or more. The gradient is in particular larger than is the number of thread grooves multiplied by 1.0 mm and preferably 1.5 mm. Consequently, given two thread grooves the gradient is preferably larger than 2 mm (3 mm) and given three thread grooves, preferably larger than 3 mm (4.5 mm).

Given a gradient that is larger (e.g. 1.5 mm or 2 mm) than in the prior art (e.g. 1 mm) one can still insert a finer thread so as to provide a still better guide for the thread ring in the hub shell. This allows enhanced centering of the freewheel component. Moreover, the axial forces are lower due to the changed geometric conditions.

In operation, the driving torque urges the hub-side freewheel component in the screwing direction such that the drive forces result in increasing pressure on the hub shell and within the hub shell. For reasons of weight, however, the hub shell is as a rule made of a lightweight material. Moreover, the wall thicknesses are reduced as much as possible to decrease the weight and aerodynamic drag (smaller cross-sectional area).

These two factors result in possible local deformation of the prior art hub shell due to the occurring loads. In the case of defective or too narrow dimensions, high loads may result in breaks of the prior art hub shell which in turn results in high injury potential. The alternative of a stronger material leads to increased weight or noticeably higher costs.

These specific embodiments are advantageous since the effective axial forces are noticeably reduced. A double-pitch (or triple-pitch) or n-pitch thread doubles (triples) the gradient angle or multiplies it by "n" while the pitch remains unchanged. Overall, the forces acting axially inwardly into the hub shell in the axial direction are considerably lower so that no hub shell deformation or at least noticeably reduced deformation occurs. The wall thickness may be reduced while safety is concurrently increased. The forces deforming the bearing seat are smaller. This achieves enhanced riding properties given high loads.

The self-retention is reduced which is again advantageous as regards loads. The self-retention of the thread is still sufficient though. Autonomous detaching need not be feared. Moreover, detaching is considerably simpler when removing or exchanging a hub-side freewheel component.

Overall, the invention reduces the total weight and air drag, while the stability under load increases.

In particular, the hub shell consists at least partially or entirely of a light metal alloy such as e.g. aluminium alloy and/or magnesium alloy and/or carbon and/or fiber-reinforced plastic.

Preferably, the hub shell includes (at least) one attachment portion and (at least) one centering portion. The hub-side freewheel component in particular includes (at least) one attachment area and (at least) one centering area. Then the attachment area is connected with and in particular screwed to the attachment portion, and the centering area is centered on the centering portion.

A considerable advantage of this specific embodiment furthermore consists in the defined accommodation of the hub-side freewheel component in the hub shell. Thus, assembling a wheel and exchanging hub components show considerably improved reproducibility. In the case of hubs whose roller bearing seat is configured on the freewheel component, trials and tests performed by the applicant have shown that exchanging hub components showed quite considerable wheel centering errors. Considering that e.g. caliper brakes provide for a very narrow gap between the brake pad and the braking area on the rim, such a centering error may have quite considerable consequences.

If, for the purpose of maintenance, for example the hub-side freewheel component or a roller bearing in a defined accommodation therein or pressed in is to be exchanged, then the entire wheel may have to be re-centered. A significant cause of these centering errors e.g. in the case of hub-side freewheel components screwed into the hub shell is that a screwed connection does not ensure precise centering. The exact radial position of the hub-side freewheel component depends on the manufacturing tolerances in general and specifically also on the type of manufacturing and type of the thread. Thus, given basically identical hub-side freewheel components the thread may begin at a slight offset due to the thread gradient. When screwing in different (while per se manufactured identically) hub-side freewheel components, this may among other things, result in a slight radial offset and optionally a slightly different orientation. Due to the radially differing dimensions of the hub-side freewheel component and the hub shell, the radial positions may differ even if the hub-side freewheel component is e.g. firmly screwed into the hub shell.

These differences, even if they are minimal, are considerably intensified due to the different diameters of the hub (respectively hub-side freewheel component) and the wheel where they cause correspondingly intensified deflections which may cause insufficient centering of a wheel due to exchange of parts e.g. in the hub interior. This may necessitate full re-centering or dismantling followed by re-assembly.

It is very advantageous to connect an attachment area of the freewheel component with the attachment portion of the hub, and to guide or center a centering area of the freewheel component by the centering portion of the hub. This allows a considerable reduction in deviations when assembling and exchanging hub parts.

Integrating a rolling member in the hub-side freewheel component allows a choice of a lateral axial distance of the roller bearings for supporting the hub shell that is considerably increased. This also allows a considerable improvement in the lateral stiffness of a wheel equipped therewith.

The rotor and also the hub shell is/are disposed in the same axial positions both in the freewheel position and in the engagement position. In the engagement position, a driving torque in the direction of drive rotation can be transmitted from the rotor to the hub shell. In the freewheel position, the rotor and the hub shell are preferably decoupled from one another wherein then in the freewheel position, no or an insignificant rotational force is transmitted between the hub shell and the rotor.

The axial engagement components in particular protrude axially and/or act in the axial direction.

The hub-side freewheel component is a separate part and is not integrally formed with the hub shell since a hub shell tends to consist of one or more components of a lightweight material or of several lightweight materials such as light metal or fibrous composite material while the freewheel component is at least in part manufactured from (at least) a/one stronger and thus often heavier material. For example, steel is a suitable material for the freewheel component.

When two items of hub-side freewheel components (e.g. during maintenance) are installed sequentially, then the radial positioning is defined by the centering portion and is largely identical. If the items are different, an identical radial positioning is achieved. Thus, differences in orientation or in centering a wheel are largely avoided. Even after replacing hub-side freewheel components and/or rolling members or roller bearings a wheel may be used immediately and does not require re-centering or even disassembling.

A radial tolerance or radial play between the hub-side freewheel component and the hub shell is preferably larger in the attachment portion than in the centering portion. Radial tolerance is also understood to include play. Thus, radially different positions may ensue in the attachment portion (absent the centering portion), depending on the tolerances and on manufacturing.

In the assembled state, no actual play is present since the hub-side freewheel component is fixedly connected with the hub shell. The ensuing actual radial positioning, however, depends on the given tolerances respectively the play prior to installing. Depending on the assembly and the component used (within the admissible manufacturing tolerances), different radial positioning may ensue which, although showing minor absolute deviations, may show considerably increased effects due to the leverage.

In preferred configurations, the radial tolerance (the radial play) between the hub-side freewheel component and the hub shell at the centering portion is less than half that at the attachment portion. In particular, is the radial tolerance in the centering portion less than ¼ of the radial tolerance in the attachment portion.

In preferred specific embodiments, the centering portion shows a free fit of less than 20 μm radial tolerance or play and in particular a radial tolerance of less than 10 μm and preferably less than 5 μm or even less than 3 μm.

In particularly preferred configurations, a transition fit is formed in the centering portion and the centering area. This means that depending on the current manufacture a loose, free fit or (preferably loose) interference fit may be given. Depending on the actual dimensions a slight undersize or oversize may be present.

A "centering area" and an "attachment area" is understood to mean a concrete, physical portion or part of a body.

In other preferred embodiments, an interference fit or an oversize fit is configured in the centering portion and the centering area. The inner part is always larger than the outer part. In assembly, the outer part (as a rule, the hub shell) is slightly extended. Preferably an oversize is given in the range between 0 μm and about 20 μm, in particular approximately 5 μm+/−5 μm.

An interference fit (and also a transition fit) allows to achieve a precisely defined orientation of the hub-side freewheel component and thus also of the roller bearing or the rolling members respectively. Even after dismantling and subsequently reassembling the hub with the same or exchanged components, centering does not require any finishing work. In particular, in the case of exchanging components the rim is prevented from axial displacement by a few tenths or possibly as little as ¹⁄₁₀ or ²⁄₁₀ millimeters.

In particularly preferred configurations, the attachment portion and the attachment area are each provided with threads having two, three or more matched thread grooves for screwed connection. Preferably, the attachment area shows a (multiple) external thread to screw into a (multiple) internal thread screwed into the attachment portion of the hub shell. Alternately, it is possible for the freewheel component to be internally threaded to be screwed onto a hub shell stub. In all the configurations, it is particularly preferred for the thread grooves to extend in parallel and adjacent to one another with the 1st thread groove and the 2nd thread groove alternating in the axial direction.

In all the configurations, it is preferred for the hub-side freewheel component to comprise an axial body section.

Preferably, the hub shell includes at least one shoulder for supporting the hub-side freewheel component and/or a roller bearing. It is possible for a washer to be disposed between a shoulder in the hub shell and the hub-side freewheel component.

Then in particular, the washer shows a contact surface with the hub shell that is larger than with the hub-side freewheel component. The contact surface with the hub shell is preferably at least 25% and preferably at least 50% and particularly preferably at least 75% larger than the contact surface with the hub-side freewheel component. This allows the achievement of an effective pressure distribution on the hub shell which reduces the local load on the hub shell.

To this end, the washer preferably consists of a material harder than that of the hub shell and/or of a material harder than aluminium. The washer preferably consists at least partially or entirely of a material such as steel.

It is possible for the centering area to show a larger outer diameter than does the attachment area. In such a configuration, it is possible and preferred for the hub-side freewheel component to comprise an outwardly protruding appendix extending from the axial body section (radially or inclined) outwardly. Then, the centering area is preferably formed (radially outwardly) on the appendix.

Then, a stopper is in particular formed on the axially inside surface of the appendix which when mounted rests against a radial shoulder of the hub shell.

It is also possible for a front face of the axial body section to be provided with a stopper which in the mounted state rests against the shoulder (a radial shoulder) of the hub shell.

An advantage of these configurations including a stopper consists in that the hub-side freewheel component rests against the, respectively a, radial shoulder of the hub shell when assembled as intended. This achieves a sufficiently stable support in the hub shell even while the hub-side freewheel component is screwed in. This configuration reliably prevents the hub-side freewheel component from penetrating ever further into the hub shell in operation.

In all the configurations, the hub-side freewheel component comprises in particular an annular flange extending inwardly from the axial body section. The annular flange in particular extends radially inwardly on the axially outwardly end of the axial body section. The axially outside surface of the annular flange is preferably provided with the engagement components in particular in the shape of an axial toothing. The annular flange may also be provided with at least one tool contour which can be gripped with a separate tool for mounting and/or detaching the hub-side freewheel component.

In advantageous specific embodiments, the hub-side freewheel component comprises the axial body section having an inner central receiving space and a bearing seat formed thereat and a roller bearing received thereat to rotatably support the hub shell. The roller bearing then comprises rolling members. Preferably, the roller bearing rests against a washer, if provided.

Another advantage is that the distance between the two rotor bearings may also be enlarged so as to achieve increased rigidity there. It is also very advantageous that the hub is simpler in its architecture. The hub axle does not require any inwardly bulge to increase rigidity.

At the same time the invention allows a clearly more lightweight hub architecture overall which is moreover combined with higher rigidity. A weight advantage is achieved by way of a more lightweight configuration of the hub-side freewheel component. Another weight advantage is achieved by way of configuring the hub shell respectively the hub sleeve and parts of the hub axle with thinner walls.

In a preferred specific embodiment, the two freewheel components are biased in the engagement position by way of at least one biasing device. The freewheel components preferably each comprise engagement components (at both freewheel components) configured on the front face which mesh with one another in the engagement position. In this way in the engagement position the engagement components transmit rotational movement in the driving direction from the rotor to the hub shell. In the freewheel position, a rotation of the freewheel components relative to one another is possible and thus also of the hub shell relative to the rotor. In particular, is the rotor-side freewheel component urged in the direction of the hub-side freewheel component by the biasing device.

In all the configurations, it is preferred for the freewheel components to comprise an axial toothing each. The freewheel device is in particular configured as a toothed disk freewheel. Then, the engagement components are preferably provided by axial teeth which are in particular biased to the engagement position by means of at least one spring or a plurality of springs or spring members. The number of engagement components on each freewheel component is in particular between 16 and 80 and in particular between 18 and 72. This allows very quick responses.

In particularly preferred configurations, the number of engagement components for each of the freewheel components is between 24 and 42, and in a concrete configuration, 30 (+/−4). This ensures very high stability under load, for example including in electro-assisted bicycles, while responsivity is still very quick.

Preferably, the rotor-side freewheel component is non-rotatably and axially movably accommodated on the rotor and the hub-side freewheel component is non-rotatably and in particular also axially fixedly coupled with the hub shell. The rotor-side freewheel component is in particular configured as, or comprises, a toothed disk and its front face shows an axial toothing.

In preferred specific embodiments and configurations, the axial body section of the hub-side freewheel component respectively at least part of the axial body section is tubular in design and may be referred to as a tubular body section. In preferred configurations, the axial or tubular body section has a round outer cross-section. Then the round outer cross-section is in particular provided with (at least) one external thread with which the axial (tubular) body section is preferably screwed into (at least) one internal thread of the hub shell when assembled. Then the axial (tubular) body section is axially fixedly and non-rotatably connected with the hub shell. The tubular body section is preferably configured substantially cylindrically.

When the axial body section shows an outwardly projecting appendix and an inwardly projecting annular flange, then the cross section may (at least substantially) be configured in a T-shape. Then, the annular flange and the appendix may be axially overlapping or at least be located approximately in the same axial position. An S- or Z-shaped cross-section is also conceivable. In the case of a T-shaped cross-section, the crossbar of the "T" and thus the annular flange and the appendix are preferably disposed axially outwardly while the axial or tubular body sections extend further inwardly into the hub shell respectively into the hub. This configuration and this e.g. T-shaped cross-section allow a compact architecture and high stability under load. Then the axially outside surface (relative to the hub) of the annular flange is equipped with the engagement components. The axially inside surface (relative to the hub) of the appendix provides a stopper which (in the mounted state) rests against the radial shoulder in the hub shell. This provides a larger volume of material in the hub shell for reliably transmitting the forces acting on the hub shell so as to provide a lightweight though stable hub. Structured elevations or depressions may be disposed on the axially outside surface of the appendix to allow gripping the hub-side engagement component with a tool, e.g. for screwing in, and in particular unscrewing, the engagement component.

The bearing seat is preferably configured on the axial and/or tubular body section and in particular radially inwardly thereof.

In a particularly preferred configuration, in a radial section the hub-side freewheel component is preferably substantially L-shaped in cross-section wherein one of the legs of the "L" forms the axial or tubular body section and the other of the legs of the L extends in the radial direction (radially inwardly) and is equipped with the engagement components. Such an L cross-section is in particular present in the absence of a radially outwardly appendix. This allows a very compact architecture.

Preferably, the hub-side freewheel component accommodates more than ⅔ of the axial width of the roller bearing. In particular, a substantial respectively the most substantial part of the roller bearing shows a defined accommodation on the bearing seat of the hub-side freewheel component. Preferably, the hub-side freewheel component accommodates more than 50% and particularly preferably more than 75% of the axial width of the roller bearing.

In other configurations, the hub-side freewheel component accommodates between approximately 80% and 90% or between 80% and 99.5% and in particular between 90% and 99.5% of the axial width of the roller bearing. Preferably these configurations show a clear distance (in the axial direction) between the axially inwardly front face of the axial body section and the hub shell. The clear distance generates a play between the axially inwardly front face of the axial body section and the hub shell.

Particularly preferably, the roller bearing is completely accommodated on the bearing seat of the hub-side freewheel component. Particularly preferably the bearing seat in the hub-side freewheel component is configured wider than is the outer ring of the roller bearing. This allows the outer ring of the (rotor-side) roller bearing to bear against the hub shell with its inwardly axial end, and with the axially outwardly end, to show a clear distance (play) to the axially inside surface of the annular flange of the hub-side freewheel component.

Preferably, a radial bearing shoulder is formed in the hub shell for defined axial alignment of the roller bearing accommodated in the hub-side freewheel component. The roller bearing respectively the outer ring of the roller bearing is in particular positioned in an axially defined position between the radial bearing shoulder in the hub shell and the annular flange. Preferably, a defined play is provided on one axial side and on the other axial side the roller bearing is disposed without play. A disadvantageous overdefinition is thus prevented. Preferably, a clear distance is formed between the roller bearing (specifically its outer ring) accommodated in the hub-side freewheel component and the axially inside surface of the annular flange. The clear distance provides for axial play. The clear distance is in particular larger than 0.02 mm or 0.05 mm. The clear distance is preferably larger than 0.1 mm or larger than 0.2 mm and may be up to and larger than 0.5 mm or 1 mm. The clear distance is provided in particular between the axially inside surface of the annular flange and the outer ring of the freewheel-side roller bearing for the hub shell. In a preferred configuration, the clear distance is between 0.02 mm and 0.35 mm.

In advantageous configurations, the biasing device is accommodated in the rotor-side freewheel component. The biasing device may comprise a spring or several springs, for example one (or more) coil spring(s) and/or at least one spring acting by way of magnetic forces. The biasing device is, in particular, substantially entirely and particularly preferably entirely accommodated inwardly of the rotor-side freewheel component. This offers considerable advantages as regards the axial mounting space since the rotor-side freewheel component does not, or only very little, extend in the axial direction so as to allow saving axial mounting space. This allows a further increase in the hub rigidity. The biasing device may likewise operate magnetically and work according to the principle of magnetic forces of attraction or repulsion. Then, a part of the biasing device may be disposed outwardly of the rotor.

The rotor-side freewheel component in particular comprises an in particular cylindrical guide section having a non-round outer contour meshing with a matching or adapted non-round inner contour in the rotor to enable axial movability of the rotor-side freewheel component relative to the rotor, and to provide the non-rotatable coupling between the rotor and the rotor-side freewheel component.

In preferred configurations, the front face end of the rotor-side freewheel component is configured as a rotor-side annular flange with the engagement components disposed thereat (on the front face).

Preferably, the rotor-side freewheel component with the guide section and the rotor-side annular flange disposed on the front face end shows a cross-section approximately L-shaped in the radial direction. An axially aligned leg is formed by the guide section. A radially aligned leg is formed by the front face of the rotor-side annular flange.

Preferably, the biasing device urges the front face of the rotor-side annular flange with the engagement components in the direction of the hub-side freewheel component. Then, the biasing device preferably rests against the inside of the rotor-side annular flange.

The rotor-side annular flange and the (cylindrical) guide section preferably substantially form the rotor-side freewheel component. The guide section and the rotor-side annular flange are particularly preferably manufactured integrally.

Particularly preferably, the biasing device is axially supported outwardly (immediately) against a rotor bearing to rotatably support the rotor. Then, the biasing device is particularly preferably directly and immediately supported on an outer bearing ring of the rotor bearing.

In all the configurations, the bearings for supporting the hub shell and the rotor bearings for supporting the rotor are preferably configured as roller bearings and in particular as a commercially available and/or standardized deep-groove ball bearing, comprising an outer bearing ring (also referred to as outer ring), an inner bearing ring (also referred to as inner ring) and in-between, rolling members disposed in particular in a rolling member cage. At least one of the roller bearings and/or the rotor bearings is preferably provided with bearing seals directly attached to the roller bearing and preventing entry of water and/or dust into the interior of the roller bearing.

The biasing device may be indirectly supported on a rotor bearing for example if a disk is disposed between the rotor bearing and the biasing device. Supporting the biasing device immediately on the rotor bearing allows a particularly space-saving architecture, at any rate with the biasing device configured as a cylindrical coil spring. In other configurations, it is also possible to employ a number of single springs which are supported on the outside of the rotor bearing or other components.

Preferably a sealing device is provided between the rotor and the hub shell. The sealing device in particular comprises a non-contact labyrinth gap diverting at least once. Furthermore, the sealing device preferably comprises at least one contacting sealing lip in particular downstream of the labyrinth gap. The sealing device in particular prevents access of water and dust to the freewheel device as extensively as possible and in particular the most extensively possible. The sealing lip is preferably provided radially further inwardly than the labyrinth gap.

In all the configurations, it is particularly preferred for the rotor and preferably the hub to be provided for largely or completely no-tools dismantling. The hub shell is preferably plugged, the limit stops are in particular plugged on (inserted or preferably pushed on) and the hub is—optionally apart from the hub-side freewheel component—preferably provided for entirely no-tools dismantling. The hub-side freewheel component may likewise be provided for no-tools dismantling. This facilitates assembly and dismantling and thus also maintenance or repairs.

When mounted, a clamping force of the hub is preferably supported via the inner rings of the roller bearings of the hub shell and the inner rings of the rotor bearings. In particular, at least one sleeve body each is disposed for form-fit force transmission of the clamping force, between the freewheel-side roller bearing of the hub shell and the freewheel-side rotor bearing and between the two rotor bearings. In this way, a form-fitting and particularly stable hub is provided. The rolling members of the bearings do not need to transmit the axial clamping force of the hub in the frame or the fork.

In preferred specific embodiments, the hub comprises a clamping system for attaching the hub to a fork or a frame. The clamping system comprises a clamping axle and a clamping lever. The clamping axle is guided through the hollow hub axle for attaching the hub or a wheel equipped therewith to a fork or a frame. The outer diameter of the clamping axle is preferably matched to the inner diameter of the hub axle. The outer diameter of the clamping axle and the inner diameter of the hub axle in particular differ by less than 5% and preferably less than 1%.

In all the configurations, it is preferred for the hub to be designed for use with a through axle. Preferably, the hub comprises a through axle.

It is preferred to provide limit stops which are pushed onto the axle or hub axle or inserted into the hub axle. It is possible to provide exchangeable limit stops with one set of limit stops configured to accommodate a through axle and another set of limit stops provided to accommodate for example a quick release. The latter set of limit stops shows axially outwardly cylindrical shoulders which are configured to be received in the dropouts of a frame and whose outer diameter is preferably smaller than an inner diameter of the hub axle in a central region of the hub axle. When the hub is delivered with two sets of limit stops, the user may choose whether to use them with the through axle or with a quick release. Later retrofitting is also possible.

All the configurations may be provided with more than two roller bearings to support the hub shell. Then at any rate (at least) one roller bearing is disposed on each of the two end regions. More than two rotor bearings may likewise be employed.

BRIEF DESCRIPTION OF THE DRAWINGS

Further advantages and features of the present invention can be taken from the exemplary embodiments which will be discussed below with reference to the enclosed figures.

The figures show in.

DETAILED DESCRIPTION

Figure 1:
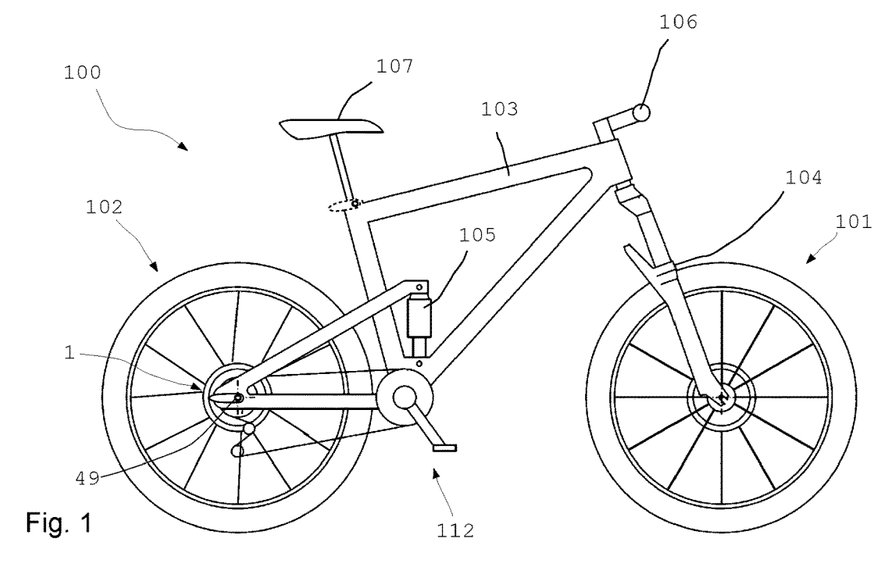
FIG. 1 a schematic illustration of a mountain bike.
Figure 2:
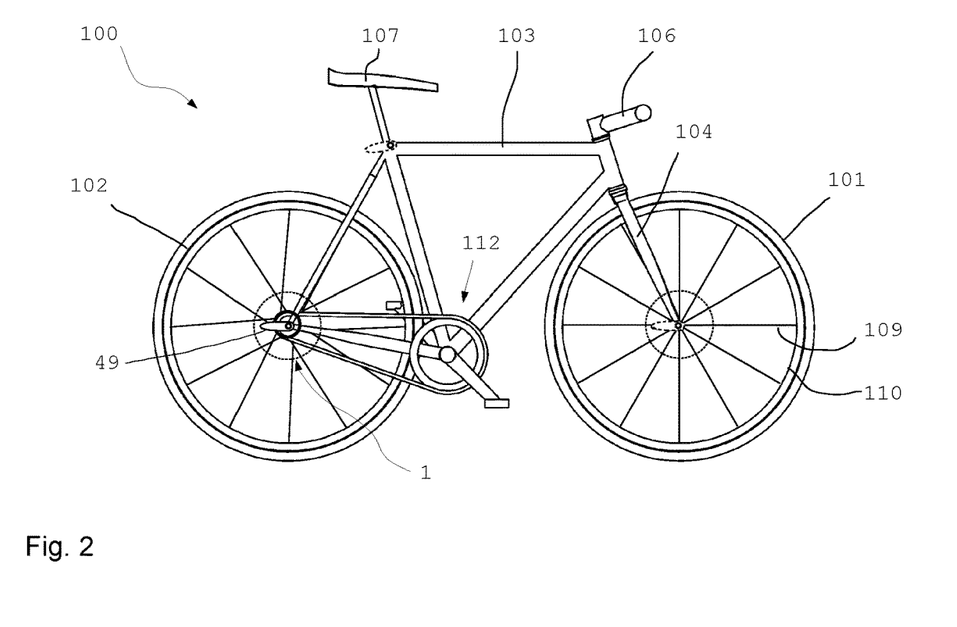
FIG. 2 a schematic illustration of a racing bicycle.

The FIGS. 1 and 2 illustrate a mountain bike or racing bicycle 100 respectively which are equipped with a hub 1 according to the invention. The mountain bike or racing bicycle 100 is provided with a front wheel 101 and a rear wheel 102. The hub 1 according to the invention is used with the rear wheel 102. The two wheels 101, 102 are provided with spokes 109 and a rim 110. Conventional caliper brakes or other brakes such as disk brakes may be provided.

A bicycle 100 comprises a frame 103, a handlebar 106, a saddle 107, a fork or suspension fork 104 and in the case of the mountain bike, a rear wheel damper 105 may be provided. A pedal crank 112 with pedals serves for driving. Optionally the pedal crank 112 and/or the wheels may be provided with an electrical auxiliary drive. The hubs 1 of the wheels may be attached to the frame by means of a clamping system 49 (e.g. through axle or quick release).

Figure 3:
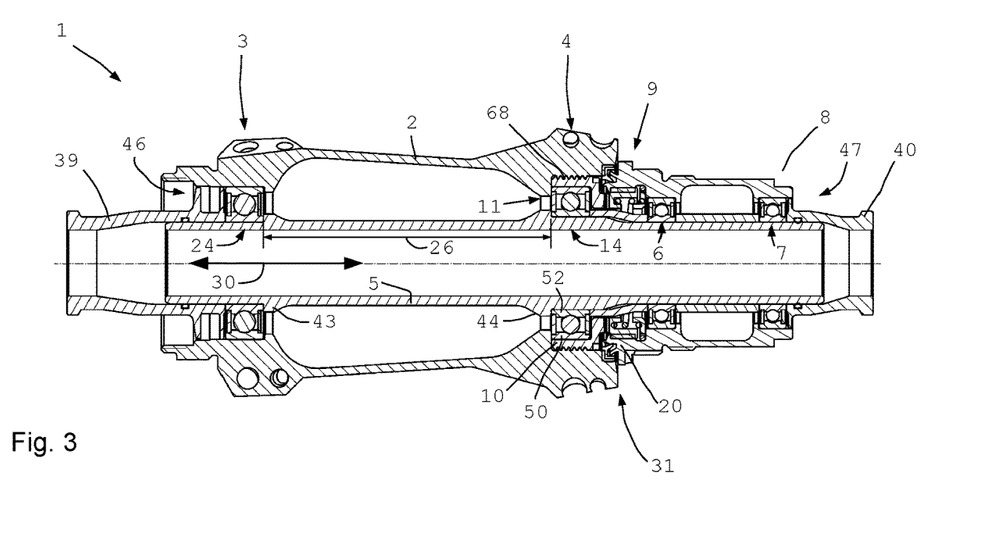
FIG. 3 a section of a hub according to the invention.

FIG. 3 shows in a section the hubs 1 inserted in the rear wheels 102 in the bicycles according to FIGS. 1 and 2.

The hub 1 according to the invention comprises a hub shell 2 which is rotatably supported in the axial end regions 3 and 4 by means of the roller bearings 24 respectively 14 to be rotatable relative to, and presently immediately on, a hub axle 5. This means that the roller bearings 14, 24 are each directly disposed on the hub axle 5. The hub axle 5 comprises an inner through hole 5a with a cylindrical inner surface. The clear diameter is dimensioned for a matching clamping axle 49a (see FIG. 6) of a clamping system 49 to pass through. Preferably only a small radial distance is provided between the outer surface of the clamping axle and the internal wall of the through hole 5a.

The hub furthermore comprises a rotor 8 on which to dispose at least one sprocket. In particular, a sprocket cluster may be pushed on and attached or arranged. A freewheel device 9 is provided between the rotor 8 and the hub shell 2, comprising the hub-side freewheel component 10 and the rotor-side freewheel component 20. To prevent penetration of water and dust into the interior of the hub 1 and in particular admission of water and dust to the freewheel device 9, a sealing device 38 is configured between the rotor 8 and the hub shell 2 comprising a labyrinth-like sealing gap and a downstream lip seal contacting the rotor and reliably protecting the freewheel from entry of dirt and water.

Limit stops 39 and 40 are pushed onto the two ends of the hub axle which—while the wheel equipped therewith is not clamped in the frame—are secured on the hub axle by way of O-rings 48. The limit stops 39 and 40 are each provided with a sealing flange 46 or 47 protecting the ends of the hub 1 from entry of dirt and water. This rotor-side limit stop 40 is provided with a radial sealing flange 47 while the other limit stop 39 is provided with a double flange 46 consisting of a pair of radial sealing flanges between which an axial distance and free space is formed.

The hub bearings 14, 24 configured as roller bearings for rotatably supporting the hub shell 2 rest on radial shoulders in bulges 43, 44 of the hub axle 5. The bulges 43 and 44 are each located axially inwardly of the bearings 14, 24.

The rotor-side hub bearing 14 is supported in an axially longitudinal section 5b in a bearing seat 68. The inner ring 52 is received on an inner bearing seat 68a on the outer surface of the longitudinal section 5b, and the outer ring 50 is received on the bearing seat 68b in the interior of the hub-side freewheel component 10. In the region of the axially longitudinal section 5b, the outer diameter of the hollow hub axle 5 is larger than in a central region 5c centrally between the bulges 43, 44. The slight increase of the wall thickness (see also FIG. 6) achieves a clearly more even load curve on the hub.

In all the configurations of the hub 1, the bulges 43, 44 preferably show a somewhat larger radial wall thickness of the hub axle 5. In particular, is the radial wall thickness in the region between about 1.5 times and 3 times the radial wall thickness in the other regions. Other than the bulges 43, 44 and the axially longitudinal section 5b the hub axle 5 is substantially a hollow cylinder in configuration and shows differences in the wall thickness of preferably less than 25% and in particular less than 15% or less than 10% or less than 5% or less than 2%. Preferably, the relationship of the maximum outer diameter of the hub axle (incl. bulge) to the minimum inner diameter of the hub axle is less than 2.0 and in particular less than 1.75. Preferably, the relation of the maximum outer diameter of the hub axle to the minimum inner diameter of the hub axle is larger than 1.25 and in particular larger than 1.5.

The rotor 8 is rotatably (and immediately) supported on the axle 5 by means of a pair of rotor bearings 6 and 7.

The roller bearing 14 is accommodated inwardly of the hub-side freewheel component 10 in a central receiving space 11 in a defined location on a bearing seat 68. This allows to save considerable axial mounting space so that the stability and rigidity of the hub can be increased. Moreover, the total weight of the hub 1 is considerably reduced. Both the weight of each of the freewheel components and the weight of the hub shell can be reduced since the wall thickness in the rotor-side end region 4 of the hub shell 2 can be reduced.

Figure 4:
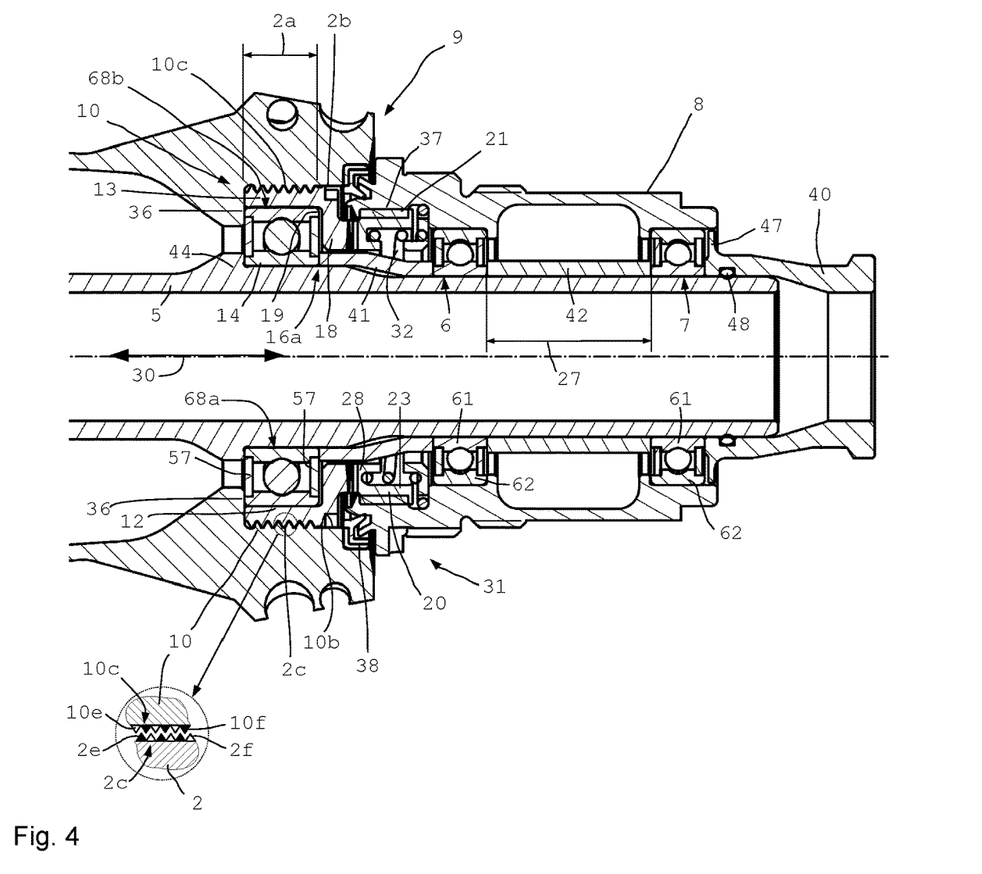
FIG. 4 an enlarged detail of the section in FIG. 3.

FIG. 4 shows an enlarged detail from FIG. 3, with the freewheel device 9 once again shown in the engagement position 31, in which the engagement components 33 designed in particular as axial toothings 10d, 20d (see FIGS. 5, 8), of the freewheel component 10 and the freewheel component 20 are in non-rotatable engagement with one another. The engagement components 33 are configured such that given a rotational direction in the driving direction a rotational force is reliably transmitted to the hub shell 2, while given an opposite rotational direction the freewheel component 20 is urged axially outwardly counter to the biasing force of the biasing device 32 until the engagement components 33 disengage so as to enable a rotation of the rotor relative to the hub shell. The rotor-side freewheel component 20 is provided with a guide section 23 showing a non-round outer contour 21. The non-round outer contour 21 meshes with a matching, non-round inner contour 37 in the rotor 8 and is axially displaceable in parallel to the axial direction 30 in the rotor 8.

This freewheel component 10 shows in radial cross-section an approximately L-shaped configuration where an axial body section 13 has a multiple external thread 10c in an attachment area 10a that screws into an internal thread 2c in the attachment portion 2a in the hub shell so that the freewheel component 10 is axially fixedly and (in the driving direction) non-rotatably connected with the hub shell 2.

The centering portion 2b in which the centering area 10b of the hub-side freewheel component 10 is received in a close fit serves for defined radial positioning of the hub-side freewheel component 10 and the roller bearing 14 accommodated therein. In particular, is the fit nearly without play. An interference fit may be provided so that the hub-side freewheel component 10 is pressed into the hub shell 2 (during screwing in). This centering area 10b is configured on the axially outwardly end of the freewheel component 10.

A cylindrical bearing seat 68b is formed radially inwardly of the axial body section where the rotor-side roller bearing 14 is accommodated to rotatably support the hub shell 2. When the roller bearing 14 is mounted it is form-fittingly accommodated in the axial direction on the axially longitudinal section 5b with its inner ring between the bulge 44 and the sleeve body 41.

The force-fit in the axial direction 30 is effected from the limit stop 40 via the inner ring 61 of the rotor bearing 7, the sleeve body 42, the inner ring of the rotor bearing 6, the sleeve body 41, the inner ring of the roller bearing 14, and it is then introduced via the radial bulge 44 into the hub axle 5 from where it is transmitted via the radial bulge 43 to the inner ring of the roller bearing 24 from where the clamping force is ultimately dissipated via the limit stop 39.

In the mounted state, the hub-side freewheel component rests against a radial shoulder 36 inwardly of the hub shell 2. The position of the hub-side freewheel component 10 is defined by the radial shoulder 36 in the hub shell.

The rotor-side hub bearing respectively roller bearing 14 for supporting the hub shell is accommodated on the bearing seat 68 in the central receiving space 11 and takes a defined position in the hub shell 2 in the axial direction by way of the inner surface 19 of the annular flange 18 of the hub-side freewheel component 10 and the radial bearing shoulder 36. There is preferably a small axial play between the inner surface 19 of the annular flange 18 and the outer ring 50 of the roller bearing 14 while the roller bearing 14 rests against the radial bearing shoulder 36 in the hub shell 2 without play.

The roller bearing 14 preferably has a sealing unit 57 for sealing the roller bearing. Likewise, the other roller bearing 24 and the rotor bearings 6 and 7 are preferably each provided with such sealing units 57 for sealing on both sides.

Figure 12:
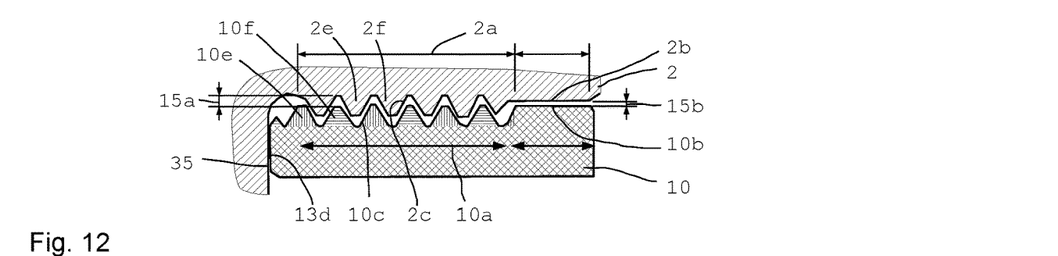
FIG. 12 a diagrammatic drawing of a detail from FIG. 4.

The hub-side freewheel component 10 is provided with a multiple external thread 10c, presently with two thread grooves 10e and 10f, as can be taken from the enlarged detail in FIG. 4 on the bottom left or alternately in FIG. 12. Accordingly, the hub shell is provided with a matching multiple internal thread 2c, presently with two thread grooves 2e and 2f. The multiple thread connection between the hub shell and the hub-side freewheel component 10 exerts less axial forces on the hub shell than does a single-thread screwed connection showing the same pitch. The reason is that the gradient angle of the thread groove is considerably larger so that smaller axial forces result. Disassembly is also facilitated since self-retention is lower. Due to the lower axial forces the hub shell is subjected to lower loads. The wall thicknesses can be reduced while durability is increased.

The rotor-side freewheel component 20 comprises on its front face a rotor-side annular flange 28 on which the engagement components 33 are configured. The rotor-side annular flange 28 is in particular configured integrally with a cylindrical guide section 23 of the rotor-side freewheel component 20. In the interior of the freewheel component 20, the biasing device 32 configured in particular as a coil spring preferably presses against the front face inner surface so that the freewheel component 20 is biased in the engagement position 31. At the other end, the coil spring 32 is preferably supported on the outer ring 62 of the rotor bearing 6. This achieves a minimum axial mounting space whereby the rigidity of the hub can be markedly increased overall.

As is illustrated in FIG. 3, a large axial distance 26 between the roller bearings 14 and 24 for rotatably supporting the hub shell is achieved. This allows to considerably increase the rigidity and stability of the hub. This considerable increase of the axial distance 26 by several millimeters allows to eliminate a double-end, floating axial support of the freewheel components 10 and 20 while still providing increased rigidity of the hub. The freewheel components 10, 20 which are in particular configured as toothed disks show even wear and a safe function is achieved. Moreover, the weight of the hub can be clearly reduced. Compared to the prior art according to EP 1 121 255 B1, the axial distance 26 between the inner rings of the roller bearings for supporting the hub shell can be enlarged by more than 5 or even 6 mm. The axial distance 27 between the rotor bearings may likewise be increased by more than 1 mm so that the stability under load of the hub 1 increases and the lateral stiffness can be considerably increased.

In FIGS. 3 and 4, a clear distance 16a can be identified between the axially outside surface of the rotor-side hub bearing 14 and the axially inside surface of the annular flange 18. The clear distance 16a provides for axial play. The roller bearing 14 accommodated in the freewheel component 10 rests against the axially inwardly end with the outer bearing ring respectively outer ring 50 on the bearing shoulder 36 in the hub shell 2 to provide defined alignment of the roller bearing 14. The other axial end shows the clear distance 16a. This avoids overdefinition.

Figure 5:
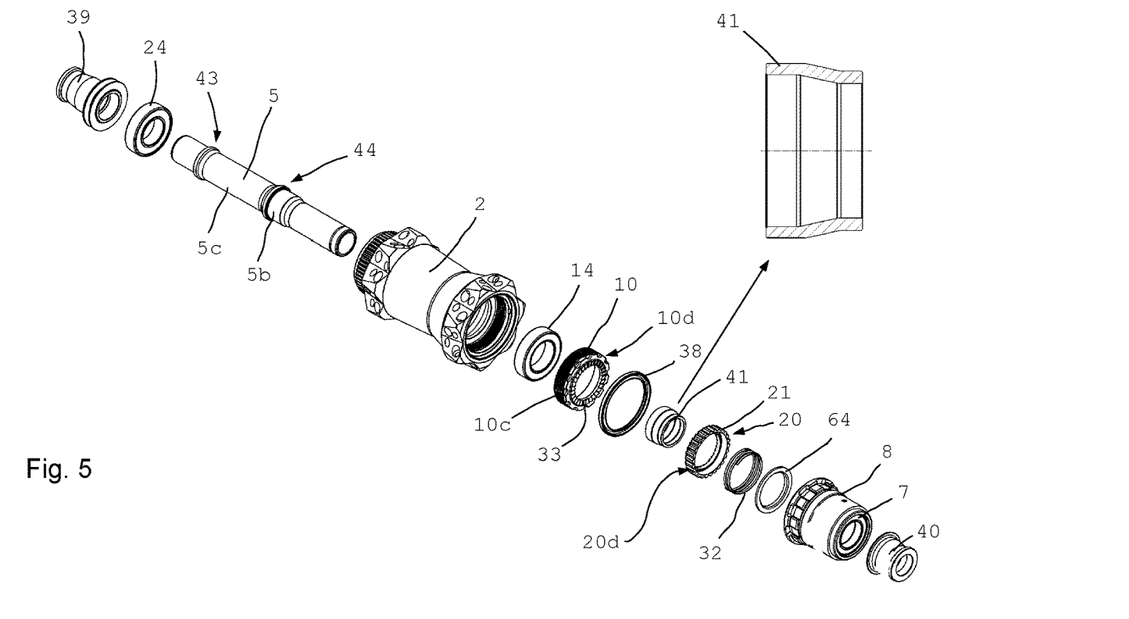
FIG. 5 an exploded view of the hub according to FIG. 3.

FIG. 5 shows an illustration of essential parts of the hub 1 according to the invention. On the left, the limit stop 39 is shown which after installation or insertion of the roller bearing 24 into the hub sleeve 2 can be pushed onto the hub axle 5. The hub axle 5 shows radial bulges 43 and 44 and the axially longitudinal section 5b. On the rotor side of the hub shell 2, the roller bearing 14 is accommodated on the bearing seat 68 of the hub-side freewheel component 10 and is screwed into the hub shell 2 together with the freewheel component 10. The centering portion 2b and the centering area 10b ensure a defined radial positioning. Thereafter, the sealing device 38 is inserted and the sleeve body 41 is pushed on. The sleeve body 41 comprises two axial and approximately cylindrical end portions and in-between, a conical section. The conical section connects the different-diameter regions.

The rotor bearings 6 and 7 with the sleeve body 42 in-between are inserted into the rotor 8. The biasing device 32 and the rotor-side freewheel component 20 are inserted into the rotor 8 and the rotor 8 is pushed onto the hub axle 5. Finally, the limit stop 40 is pushed on.

Figure 6:
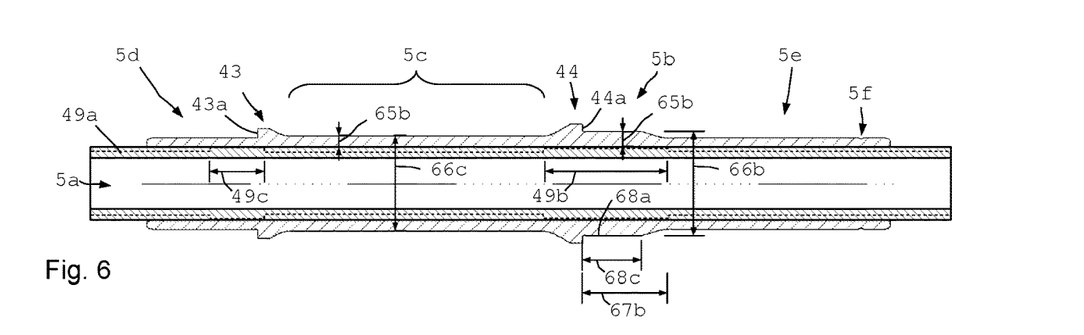
FIG. 6 a cross-section of the hub axle according to FIG. 5.

FIG. 6 shows a schematic section view of the hub axle 5, where the cylindrical inner through hole 5a can be identified. A simplistic drawing shows the clamping axle 49a of a clamping system 49 inwardly of the inner through hole 5a. The pertaining clamping lever with a clamping device and further parts such as a threaded end piece on the other end of the clamping axle 49a are not shown. While the clamping system may be configured as a conventional quick release with an eccentric lever, it may comprise only the clamping axle with two threaded ends which are screwed together, or it may comprise a through axle.

The wall thickness in the axially longitudinal section 5b of the hub axle 5 is considerably larger than in the central region 5c or in the end portions 5d (first end portion) or 5e (second or rotor-side end portion). Only in the regions of the radial bulges 43, 44, where the hub bearings 14, 24 rest against the shoulders 43a, 44a, is the wall thickness somewhat larger still, presently 4 mm. The wall thickness 65b in this case is 2.5 mm and extends over the length 68c of the inner bearing seat 68b of approximately 10 mm. The length 67b of the axially longitudinal section 5b is somewhat larger due to the slightly conical ramp region. A reasonable aspect is that the region of the bulge 44 with the shoulder 44a forms part of the axially longitudinal section 5b. The length 67b then increases correspondingly by 5 to 10 mm.

The outer diameter 66b in the region of the bearing seat 68b is 17 mm. The continuous inner diameter is approximately 12 mm and is dimensioned such that typical through axles 12 mm in diameter can be mounted. In the other sections 5d and 5e and in the central region 5c the wall thickness 65b is approximately 1.5 mm. In the proximity of one or both of its ends the hub axle 5 may comprise a circumferential groove 5f for defined axial positioning e.g. of an O-ring or the like.

FIG. 6 shows in a broken line a contour of the clamping axle 4a, where the entire clamping axle consists of cylindrical sections. At least one longitudinal region 49b is provided in which the outer cross-section of the clamping axle 49a is matched to the inner cross section of the hub axle 5. In the longitudinal region 49b, presently at the rotor-side hub bearing 14, the clamping axle 49a rests against the hub axle 5 nearly from the inside. When very high loads or overloads occur in operation, the bulged longitudinal section 49b of the clamping axle 49a prevents deflection of the hub axle 5 and radially supports the hub axle 5 from the inside. It is possible for two or more longitudinal regions to be comprised. Two longitudinal regions 49b and 49c are exemplarily shown. The longitudinal region 49c can support the hub axle on the other, opposite hub bearing. Optionally, the rotor bearings may be provided with bulges in the longitudinal regions.

Figure 7:
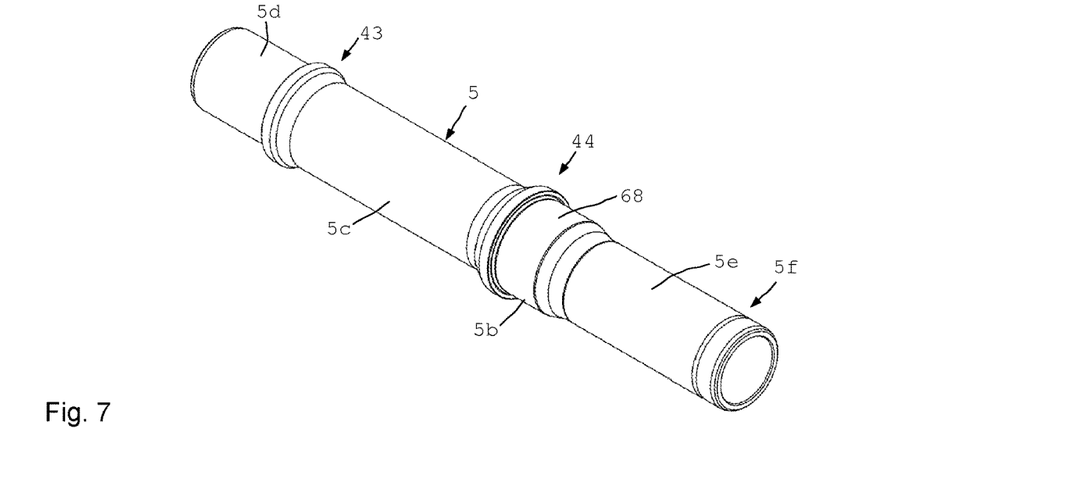
FIG. 7 a perspective view of the hub axle of FIG. 5.

FIG. 7 shows a perspective view of the hub axle only, in which one can identify the regions and sections 5d, 5c, 5b and 5e and the bearing seat 68 configured in the axially longitudinal section.

Figure 8:
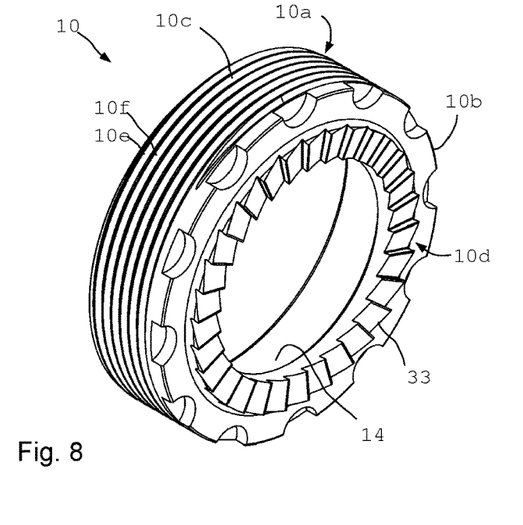
FIG. 8 a perspective illustration of the hub-side freewheel component of the hub according to FIG. 5.
Figure 9:
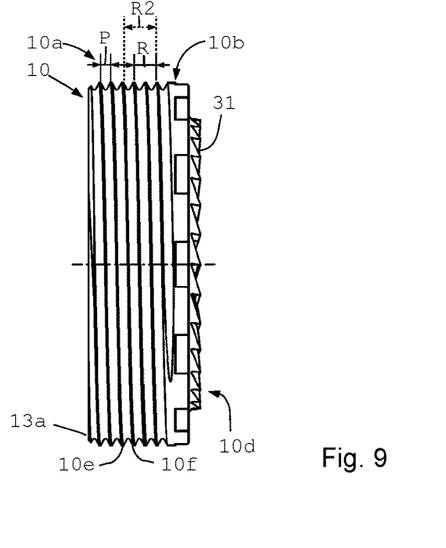
FIG. 9 a side view of the hub-side freewheel component according to FIG. 8.

FIGS. 8 and 9 show the hub-side freewheel component 10 in a perspective view and in a side view. It is apparent that the hub-side freewheel component allows a very compact architecture. The hub-side freewheel component 10 is screwed into the hub shell 2 by means of the attachment area 10a and the external thread 10c configured therein. The centering area 10b together with the centering portion 2b in the hub shell 2 ensure a defined radial seat of the hub-side freewheel component 10. A reproducible seat is also achieved when exchanging the roller bearing 14 or the hub-side freewheel component 10.

The engagement components 33 are formed on the axially outside surface on the front face of the annular flange 18 which extends radially inwardly in particular from the axial and presently tubular body section 13.

The approximately L-shaped structure 45 can be seen where the bearing seat 68 is formed radially inwardly where the roller bearing 14 shows defined accommodation.

The multiple external thread 10c with the two thread grooves 10e and 10f enables increased durability. Compared to a single thread a double gradient R is provided with the same pitch P so that self-retention and the axial forces are reduced.

The roller bearing 14 has an axial width 16 and is supported in the axial body section 13 on the bearing seat 68b over the length of the attachment area 10a across its entire axial width. An axial overdefinition is avoided by the narrow lateral distance of the outer ring 50 from the inner surface 19 of the annular flange 18.

The roller bearing 14 has an outer ring 50 and an inner ring 52 between which the rolling members 53 are disposed in guide grooves. Sealing units 57 seal the roller bearing 14 in both axial directions.

Figure 10:
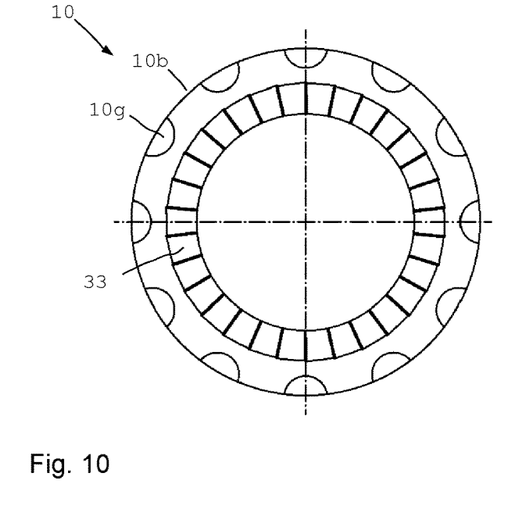
FIG. 10 a front view of the hub-side freewheel component according to FIG. 8.
Figure 11:
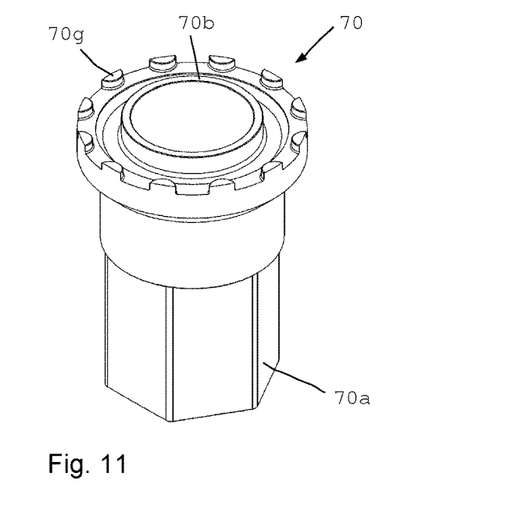
FIG. 11 a perspective view of a tool.

FIGS. 8 to 10 also show on the hub-side freewheel component 10 a tool contour 10g which serves to facilitate opening by means of an adapted tool 70 (see FIG. 11).

The tool contour 10g comprises multiple depressions (or elevations) which can be coupled with the tool 70. The tool contours 10g may show different shapes, for example the contour shown. Otherwise an inner polygon, an outer polygon, or suitable depressions are conceivable.

The semicircular cutouts 10g are distributed over the circumference. The intervals on the circumference between the cutouts 10g form the centering area 10b, providing a defined outer diameter.

The tool 70 shown in FIG. 11 shows corresponding contours 70g and can be non-rotatably coupled with the hub-side freewheel component 10. The centering 70b enables a reproducible seat. The tool end 70a allows gripping by another tool. This configuration enables a particularly compact architecture of the hub-side freewheel component, which is moreover easy to manufacture.

The axial body section 13 of the hub-side freewheel component 10 in the illustrated exemplary embodiment shows an approximately consistent radial diameter. The attachment area 10a with the multiple external thread 10c extends toward the axially inwardly end of the axial body section 13 while toward the axially outwardly end extends the centering area 10b which together with the centering portion 2b ensures a precisely defined fit and thus a precisely defined radial positioning and orientation of the hub-side freewheel component 10. The radial tolerances or the radial play in the centering area 10b is considerably smaller than in the attachment area 10a. In this configuration the hub-side freewheel component 10 may first be configured cylindrically having the diameter of the centering area 10b and it is possible for a multiple thread 10c to be cut or tapped thereafter over only part of the axial length so as to create the attachment area 10a. The outer diameter in the attachment area 10a may also be reduced somewhat to facilitate passage through the centering portion 2b.

This hub 1 prevents the attachment component 10 from screwing too far into the hub shell 2 also in that the axially inwardly front face 13a of the axial body section 13 rests against the radial shoulder 36 in the hub shell.

FIG. 12 shows a simplistic, enlarged detail from FIG. 4 which illustration is not to scale to better show the principle. Where the centering portion 2b and the centering area 10b overlap, there is a radial tolerance 15b or radial play while a considerably larger tolerance 15a is provided in the attachment area 10a and the attachment portion 2a. This achieves a clearly better, and better repeatable, radial positioning of the hub-side freewheel component 10 and thus also of the roller bearing 14 which rotatably supports one side of the hub 1 on the hub axle 5. Even minor radial changes may show major axial effects on the rim. The teeth of each of the thread grooves 10e and 10f show different hatching to more clearly show the various thread grooves 2e and 2f.

In all the configurations, the hub allows increased lateral stiffness, an increased bending stiffness, and a still safe operation, and easier maintenance. At the same time, the weight may be reduced which is of particular importance in the area of sports and for professional use.

Another advantage is the smaller cross-section of the hub body which is thus aerodynamically better. The quantity of parts is smaller so as to make servicing, assembly and disassembly easier. Manufacturing the hub is also easier.

A quite considerable advantage is achieved by the controlled disposal of the rotor-side hub bearing on a short axial portion showing an enlarged outer diameter. This allows to achieve better load distribution and increased stability.

In all the configurations it is preferred to employ ground inner bearing rings in the roller bearings. A ground outer ring may also be employed so as to obtain very low frictional values.

While a particular embodiment of the present hub, in particular for bicycles has been described herein, it will be appreciated by those skilled in the art that changes and modifications may be made thereto without departing from the invention in its broader aspects and as set forth in the following claims.

| List of reference numerals: | |
|---|---|
| 1 | hub |
| 2 | hub shell |
| 2a | attachment portion |
| 2b | centering portion |
| 2c | internal thread |
| 2e, 2f | thread groove |
| 3, 4 | end region |
| 5 | hub axle |
| 5a | through hole |
| 5b | axially longitudinal section |
| 5c | central region |
| 5d | first end portion |
| 5e | rotor portion |
| 5f | groove |
| 6, 7 | rotor bearing |
| 8 | rotor |
| 9 | freewheel device |
| 10 | hub-side freewheel component |
| 10a | attachment area |
| 10b | centering area |
| 10c | external thread |
| 10d | axial toothing |
| 10e | thread |
| 10f | thread |
| 10g | contour, cutout |
| 11 | receiving space |
| 13 | axial body section |
| 13a | axially inwardly front face |
| 13d | stopper |
| 14 | roller bearing |
| 15a | tolerance, play |
| 15b | tolerance, play |
| 16 | axial width |
| 16a | distance |
| 18 | annular flange |
| 19 | inner surface of 18 |
| 20 | rotor-side freewheel component |
| 20d | axial toothing |
| 21 | outer contour |
| 23 | cylindrical guide section |
| 24 | roller bearing |
| 26, 27 | bearing distance |
| 28 | rotor-side annular flange |
| 30 | axial direction |
| 31 | engagement position |
| 32 | biasing device |
| 33 | engagement components |
| 36 | bearing shoulder in 2 |
| 37 | inner contour in 8 |
| 38 | sealing device |
| 39, 40 | limit stop |
| 41, 42 | sleeve body |
| 43, 44 | radial bulges |
| 43a | shoulder |
| 44a | shoulder |
| 46 | double flange of 39 |
| 47 | sealing flange of 40 |
| 48 | O-ring |
| 49 | clamping system |
| 49a | clamping axle |
| 49b | longitudinal region |
| 49c | longitudinal region |
| 50, 51 | outer ring |
| 52 | inner ring |
| 53 | rolling member |
| 57 | sealing unit |
| 58 | seal ring |
| 61 | inner ring of 6, 7 |
| 62 | outer ring of 6, 7 |
| 65b | wall thickness in 5b |
| 65c | wall thickness in 5c |
| 66b | diameter in 5b |
| 66c | diameter in 5c |

-continued

| List of reference numerals: | |
|---|---|
| 67b | length of 5b |
| 68 | bearing seat |
| 68c | length of 68 |
| 70 | tool |
| 70a | coupling contour |
| 70b | centering |
| 70g | contour, inner contour |
| 100 | bicycle |
| 101 | wheel, front wheel |
| 102 | wheel, rear wheel |
| 103 | frame |
| 104 | fork, suspension fork |
| 105 | rear wheel damper |
| 106 | handlebar |
| 107 | saddle |
| 109 | spoke |
| 110 | rim |
| 112 | pedal crank |
| P | pitch |
| R | gradient |

The invention claimed is:

1. A hub for at least partially muscle-powered vehicles, comprising:
a hollow hub axle with a cylindrical inner through hole for the passage of a clamping axle;
a hub shell rotatably supported relative to the hub axle by at least two hub bearings; a rotor rotatably supported relative to the hub axle;
a freewheel device with a hub-side freewheel component and a rotor-side freewheel component, each having axial engagement components for engaging with one another;
wherein the hub shell is rotatably supported relative to the hub axle in a rotor-side end region by a rotor-side hub bearing and in an opposite end region of the hub shell, by at least one further hub bearing;
wherein the hub-side freewheel component is non-rotatably connected with the hub shell; wherein the rotor-side freewheel component is non-rotatably connected with the rotor and is movable in the axial direction relative to the rotor and the hub shell at least between a freewheel position and an engagement position;
the rotor-side hub bearing is accommodated in an axially longitudinal section of the hub axle having a diameter that is enlarged compared to a central region of the hub axle in a bearing seat of the hollow hub axle;
wherein an attachment portion and a centering portion are configured in the hub shell and wherein an attachment area and a centering area are configured on the hub-side freewheel component, and
wherein a radial bearing shoulder is formed in the hub shell for defined axial alignment of the roller bearing accommodated in the hub-side freewheel component.

2. The hub according to claim 1, wherein the rotor-side hub bearing is radially accommodated between the hollow hub axle and the rotor-side freewheel component.

3. The hub according to claim 1, wherein the clear inner diameter of the hub axle is configurable over the length of the hub axle by less than 10% or less than 1.5 mm.

4. The hub according to claim 1, wherein the inner through hole of the hub axle comprises a cylindrical inner surface.

5. The hub according to claim 1, wherein the axially longitudinal section is shorter than 30 mm.

6. The hub according to claim 1, wherein the wall thickness in the bearing seat is between 2 mm and 4 mm in the axially longitudinal section.

7. The hub according to claim 1, wherein the wall thickness of the hub axle is less than 2 mm and more than 0.75 mm in the central region.

8. The hub according to claim 1, wherein the rotor-side hub bearing shows an outer diameter between 26 mm and 30 mm and a width between 6 mm and 8 mm.

9. The hub according to claim 1, further including a clamping axle.

10. The hub according to claim 9, wherein the clamping axle shows a cylindrical outer surface at least in a longitudinal region.

11. The hub according to claim 10, wherein the outer surface of the clamping axle radially deviates by less than 0.1 mm from the cylindrical shape at least in the longitudinal region.

12. The hub according to claim 9, wherein a maximum radial distance between the clamping axle and the hub axle is less than 0.2 mm at least in the longitudinal region.

13. The hub according to claim 1, wherein the radial tolerance between the hub-side freewheel component and the hub shell on the attachment portion is larger than on the centering portion.

14. The hub according to claim 1, wherein the hub-side freewheel component is axially fixedly connected with the hub shell.

15. The hub according to claim 1, wherein the hub-side freewheel component is connected with the hub shell through a multiple thread having at least two separate, axially spaced apart thread grooves running in parallel and adjacent to one another.

16. The hub according to claim 1, wherein an attachment area is provided with an external thread with the thread grooves which screws into an internal thread with thread grooves on the attachment portion of the hub shell.

17. The hub according to claim 1, wherein the hub-side freewheel component has an axial body section with an inner central receiving space and a bearing seat formed thereat and a roller bearing received thereat to rotatably support the hub shell.

18. The hub according to claim 1, wherein the axial body section of the hub-side freewheel component is one of tubular and wherein the hub-side freewheel component comprises an appendix protruding outwardly from the axial body section on which the centering area is configured, and wherein a stopper is formed on the axially inside surface of the appendix which when mounted rests against a radial shoulder of the hub shell.

19. The hub according to claim 1, wherein the hub-side freewheel component comprises an annular flange projecting inwardly, and wherein the engagement components are configured on the axially outside surface of the annular flange, and wherein the axial body section with the inwardly projecting annular flange is L-shaped in cross-section.

* * * * *